(12) United States Patent
Ozeki

(10) Patent No.: US 7,247,399 B2
(45) Date of Patent: Jul. 24, 2007

(54) ELECTRONIC APPARATUS AND METHOD OF CONTROLLING OPERATION OF THE SAME

(75) Inventor: Akihiro Ozeki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 478 days.

(21) Appl. No.: 10/760,632

(22) Filed: Jan. 21, 2004

(65) Prior Publication Data
US 2004/0170876 A1  Sep. 2, 2004

(30) Foreign Application Priority Data
Jan. 21, 2003  (JP) .............................. 2003-012193

(51) Int. Cl.
*H01M 8/04* (2006.01)
(52) U.S. Cl. .......................... 429/13; 429/22
(58) Field of Classification Search .............. 429/9, 429/13, 22
See application file for complete search history.

(56) References Cited

U.S. PATENT DOCUMENTS

| | | | |
|---|---|---|---|
| 4,562,123 A * | 12/1985 | Shimizu et al. ............... | 429/27 |
| 4,677,037 A | 6/1987 | Takabayashi | |
| 4,962,462 A | 10/1990 | Fekete | |
| 4,968,566 A | 11/1990 | Lersch et al. | |
| 5,780,980 A | 7/1998 | Naito | |
| 5,916,699 A | 6/1999 | Thomas et al. | |
| 5,964,309 A | 10/1999 | Kimura et al. | |
| 6,093,500 A * | 7/2000 | Margiott et al. ............... | 429/13 |
| 6,103,409 A | 8/2000 | DiPierno Bosco et al. | |
| 6,326,097 B1 | 12/2001 | Hockaday | |
| 6,447,939 B1 * | 9/2002 | Iwasaki ......................... | 429/9 |
| 6,515,580 B1 * | 2/2003 | Isoda et al. ................. | 429/7 X |
| 6,649,298 B2 | 11/2003 | Hayashi et al. | |
| 2002/0055029 A1 | 5/2002 | Hayashi et al. | |
| 2002/0056134 A1 | 5/2002 | Abe et al. | |
| 2003/0142467 A1 | 7/2003 | Hachiya et al. | |
| 2004/0062960 A1* | 4/2004 | Sakaue et al. ............ | 429/25 X |

FOREIGN PATENT DOCUMENTS

| | | |
|---|---|---|
| EP | 1 091 437 A1 | 4/2001 |
| EP | 1 233 468 A2 | 8/2002 |
| GB | 1131171 | 10/1968 |
| GB | 1 304 092 | 1/1973 |
| JP | 04-145425 | 5/1992 |
| JP | 11-154520 | 6/1999 |
| JP | 2001-163063 | 6/2001 |

(Continued)

OTHER PUBLICATIONS

English translation of JP 2001-163063 (Mizuno et al.) from the Japanese Patent Office website (doc date Jun. 2001).*

(Continued)

*Primary Examiner*—Stephen J. Kalafut
(74) *Attorney, Agent, or Firm*—Pillsbury Winthrop Shaw Pittman, LLP

(57) ABSTRACT

An electronic apparatus includes a body, a fuel cell capable of generating power by chemical reaction and supplying the power to the body, a sensor to sense a tilt of the fuel cell, and a notifying portion to notify a user of information of the tilt sensed by the sensor.

5 Claims, 6 Drawing Sheets

FOREIGN PATENT DOCUMENTS

| | | |
|---|---|---|
| JP | 2002-16524 | 1/2002 |
| JP | 2002-032154 | 1/2002 |
| JP | 2002-49440 | 2/2002 |
| JP | 2002-049440 | 2/2002 |
| JP | 2002-63920 | 2/2002 |
| JP | 2002-198077 | 7/2002 |
| JP | 2003-528384 | 9/2003 |
| WO | WO 98/56058 | 12/1998 |
| WO | WO 01/79012 A2 | 10/2001 |
| WO | WO 2004/031929 | 4/2004 |
| WO | WO 2004/032269 A2 | 4/2004 |

OTHER PUBLICATIONS

U.S. Appl. No. 10/352,057, filed Jan. 28, 2003, Shogo Hachiya.
U.S. Appl. No. 10/743,560, filed Dec. 23, 2003, Akihiro Ozeki.
U.S. Appl. No. 10/758,275. filed Jan. 16, 2004, Akihiro Ozeki.
Hironosuke Ikeda, "All About Fuel Cells," Nippon Jitsugyo Publishing Co., Ltd., p. 216-217, (Aug. 20, 2001).
U.S. Appl. No. 10/740,843, filed Dec. 23, 2003, Akihiro Ozeki.
U.S. Appl. No. 10/788,030, filed Feb. 27, 2004, Akihiro Ozeki.
U.S. Appl. No. 10/787,861, filed Feb. 27, 2004, Akihiro Ozeki.
U.S. Appl. No. 10/805,497, filed Mar. 22, 2004, Akihiro Ozeki.
U.S. Appl. No. 10/806,334, filed Mar. 23, 2004, Akihiro Ozeki.
U.S. Appl. No. 10/848,064, filed May 19, 2004, Shuji Abe.
U.S. Appl. No. 10/826,910, filed Apr. 19, 2004, Shuji Abe.
U.S. Appl. No. 10/860,788, filed Jun. 4, 2004, Shuji Abe.
European Search Report dated Jul. 5, 2004 for Patent Application No. 04000520.9-2119.
Jaesung Han et al., "Direct methanol fuel-cell combined with a small back-up battery," Journal of Power Sources 112, 2002, pp. 477-483 (Aug. 3, 2003).
Japanese Office Action dated Jun. 14, 2005 for Appln. No. 2003-012193.

* cited by examiner

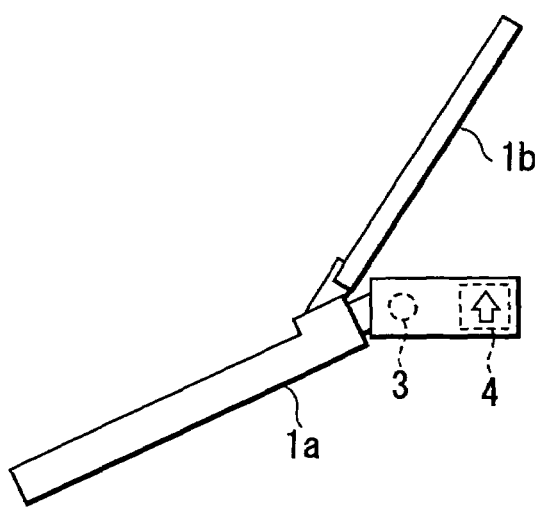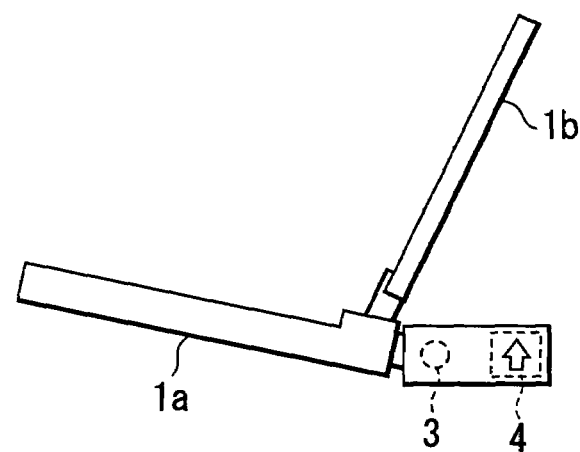
FIG. 3A  FIG. 3B
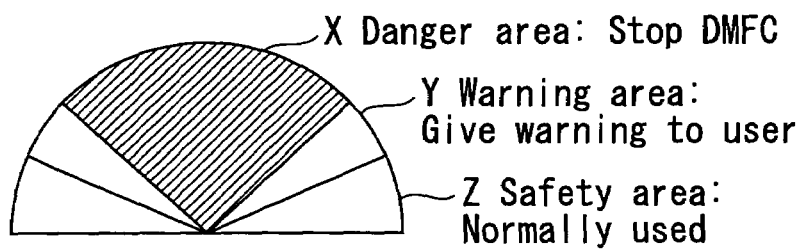
FIG. 6
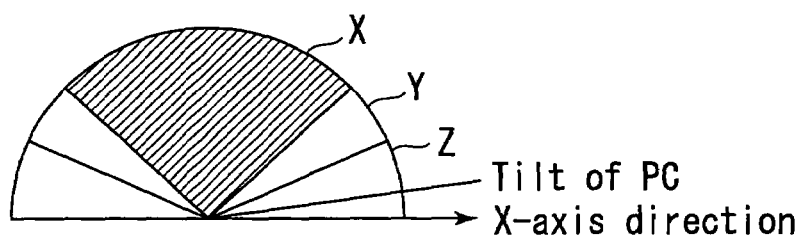
FIG. 7A
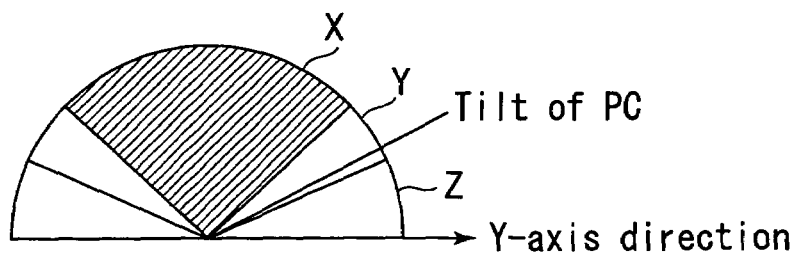
FIG. 7B

ELECTRONIC APPARATUS AND METHOD OF CONTROLLING OPERATION OF THE SAME

CROSS-REFERENCE TO RELATED APPLICATIONS

This application is based upon and claims the benefit of priority from the prior Japanese Patent Application No. 2003-012193, filed Jan. 21, 2003, the entire contents of which are incorporated herein by reference.

BACKGROUND OF THE INVENTION

1. Field of the Invention

The present invention relates to a technique of controlling an operation of an electronic apparatus operable using, for example, a direct methanol fuel cell as a power supply.

2. Description of the Related Art

Recently, portable electronic apparatuses of various types such as a digital camera and a portable information terminal called a PDA (personal digital assistant) have been developed and widely used. Such electronic apparatuses are capable of being driven by a battery.

Moreover, recently, the issue of environment has received great attention and the development of environmentally-friendly batteries has been increased. A direct methanol fuel cell (hereinafter referred to as DMFC) is well known as such a battery.

The DMFC generates electric energy by chemical reaction between oxygen and methanol provided as fuel. The DMFC has a structure in which an electrolyte is interposed between two electrodes made of porous metal or carbon. Since the DMFC produces no hazardous wastes, its practicality is strongly desired.

In using the DMFC, it needs to be kept in a fixed direction without being tilted in order to prevent drawbacks of leakage of liquid fuel, load to various pumps due to the leakage, heat generation, etc.

For example, Jpn. Pat. Appln. KOKAI Publication No. 2002-063920 discloses a technique of preventing drawbacks from occurring when a fuel cell unit tilts. According to this technique, in order to prevent water from flowing backward to a fuel cell from a water tank even when the unit tilts, tubes are connected between outlets of the fuel cell and inlets of the water tank with their sleeves tucked up.

However, the above technique produces only the advantage of preventing water from flowing backward from the water tank and cannot overcome the other drawbacks due to a tilt of the fuel cell unit. Moreover, the internal structure of the fuel cell unit becomes complicated and accordingly the unit increases in size in its entirety.

In order to prevent the drawbacks due to a leakage of liquid fuel, it is considered effective that a tilt sensor should sense a tilt of the fuel cell unit.

However, only the sensing of a tilt of the unit by the tilt sensor cannot be regarded as measures enough to reliably avoid dangerous conditions. There is a possibility that the tilt sensor will be troubled for some reason.

BRIEF SUMMARY OF THE INVENTION

Embodiments of the present invention may provide an electronic apparatus capable of preventing a danger due to a tilt of a cell unit and a method of controlling an operation of the electronic apparatus.

According to one aspect of the present invention, there is provided an electronic apparatus, comprising a body; a fuel cell capable of generating power by chemical reaction and supplying the power to the body; a sensor to sense a tilt of the fuel cell; and a notifying portion to notify a user of information of the tilt sensed by the sensor.

According to another aspect of the present invention, there is provided a method of controlling an operation of an electronic apparatus operable using a fuel cell capable of generating power by chemical reaction, the method comprising sensing a tilt of the fuel cell; and notifying a user of information of the tilt.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are side views of the electronic apparatus system in use;

FIG. 6 is a chart showing various conditions selected in accordance with sensed tilt angles;

FIGS. 7A and 7B are charts each showing an example of display of information of tilt angle and tilt direction displayed on the LCD screen of the electronic apparatus;

DETAILED DESCRIPTION OF THE INVENTION

Embodiments of the present invention will be described below with reference to the drawings.

Figure 1:
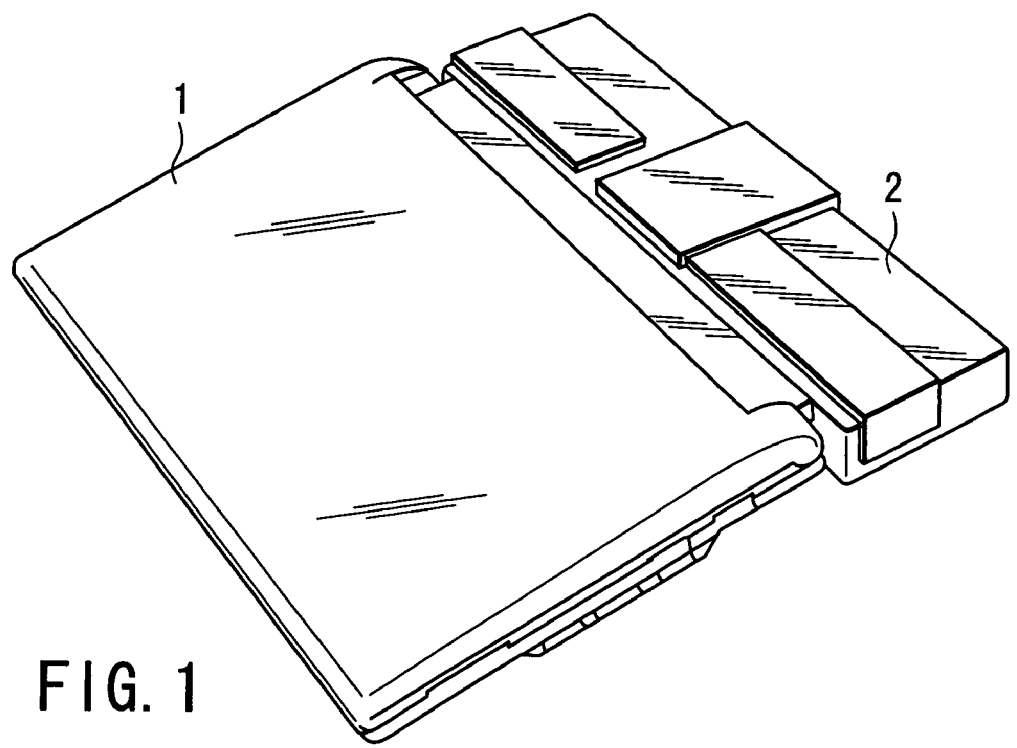
FIG. 1 is an external view of an electronic apparatus system according to an embodiment of the present invention.

FIG. 1 is an external view of an electronic apparatus system according to an embodiment of the present invention.

Referring to FIG. 1, the electronic apparatus system includes an electronic apparatus 1 and a fuel cell unit 2 that is detachable from the electronic apparatus 1. The electronic apparatus 1 is a notebook personal computer in which a top cover having an LCD (liquid crystal device) on its inner side is attached to the main body by a hinge mechanism such that it can freely be opened and closed. The electronic apparatus 1 is capable of being operated by power supplied from the fuel cell unit 2. The fuel cell unit 2 includes a DMFC capable of generating power by chemical reaction and a repeatedly chargeable/dischargeable secondary battery.

Figure 2A:
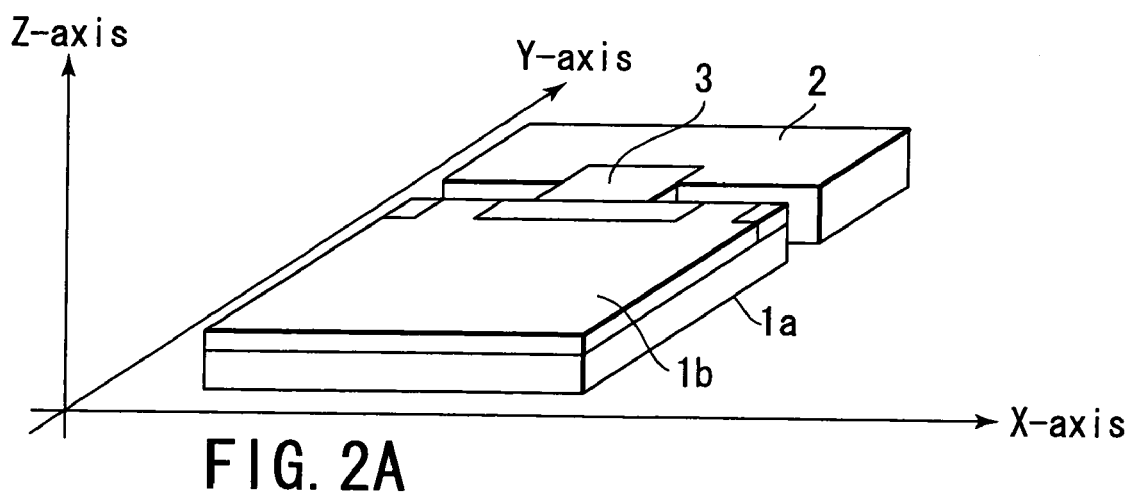
FIGS. 2A and 2B are perspective and side views illustrating a variable mechanism capable of varying the angle of a fuel cell unit to an electronic apparatus.
Figure 2B:
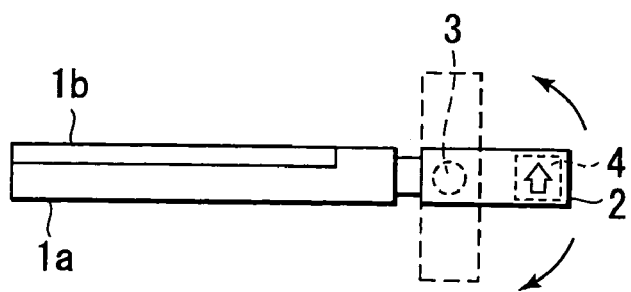

FIGS. 2A and 2B are perspective and side views illustrating a variable mechanism capable of varying the angle of the fuel cell unit 2 to the electronic apparatus 1.

Referring to FIG. 2A, the electronic apparatus 1 includes a main body 1*a* and a liquid crystal panel 1*b* and is connected to the fuel cell unit 2 through a variable mechanism 3. In this case, the fuel cell unit 2 is attached to the variable mechanism 3 by a hinge section such that it can be rotated in the Z-axis direction (vertical direction) in FIG. 2A with respect to the main body 1a.

More specifically, as shown in FIG. 2B, the angle of the fuel cell unit 2 to the main body 1a can vertically be varied 90 degrees at the maximum.

In the attaching section (hinge section) between the fuel cell unit 2 and variable mechanism 3, the unit 2 is fastened on the variable mechanism 3 by a fastening member to such an extent that a user can easily rotate the unit 2 by his or her hand. If the user rotates the fuel cell unit 2 and moves his or her hand off the unit 2, a fixed angle is maintained between the unit 2 and mechanism 3 by moderate friction and fastening force.

The fuel cell unit 2 contains a tilt sensor 4 for sensing the angle and direction of the tilted fuel cell unit. When a user uses the electronic apparatus 1, the fuel cell unit 2 has to be put in a horizontal position for safety. The tilt sensor 4 notifies the main body 1a whether the fuel cell unit 2 is safe or dangerous.

In the present embodiment, an angle between the main body 1a and fuel cell unit 2 can be varied as described above. As shown in FIGS. 3A and 3B, therefore, the main body 1a can be put in a state (not horizontal) where a user can easily operate the electronic apparatus 1 while keeping the unit 2 in a horizontal position. This state is effective in, for example, using the electronic apparatus system on user's lap in an automobile.

In the foregoing embodiment, an angle between the main body 1a and fuel cell unit 2 can be set at 90 degrees. Thus, the electronic apparatus system can safely be carried with the main body 1a in a vertical position. It is thus possible to save a user from stopping the DMFC while the system moves.

Figure 4:
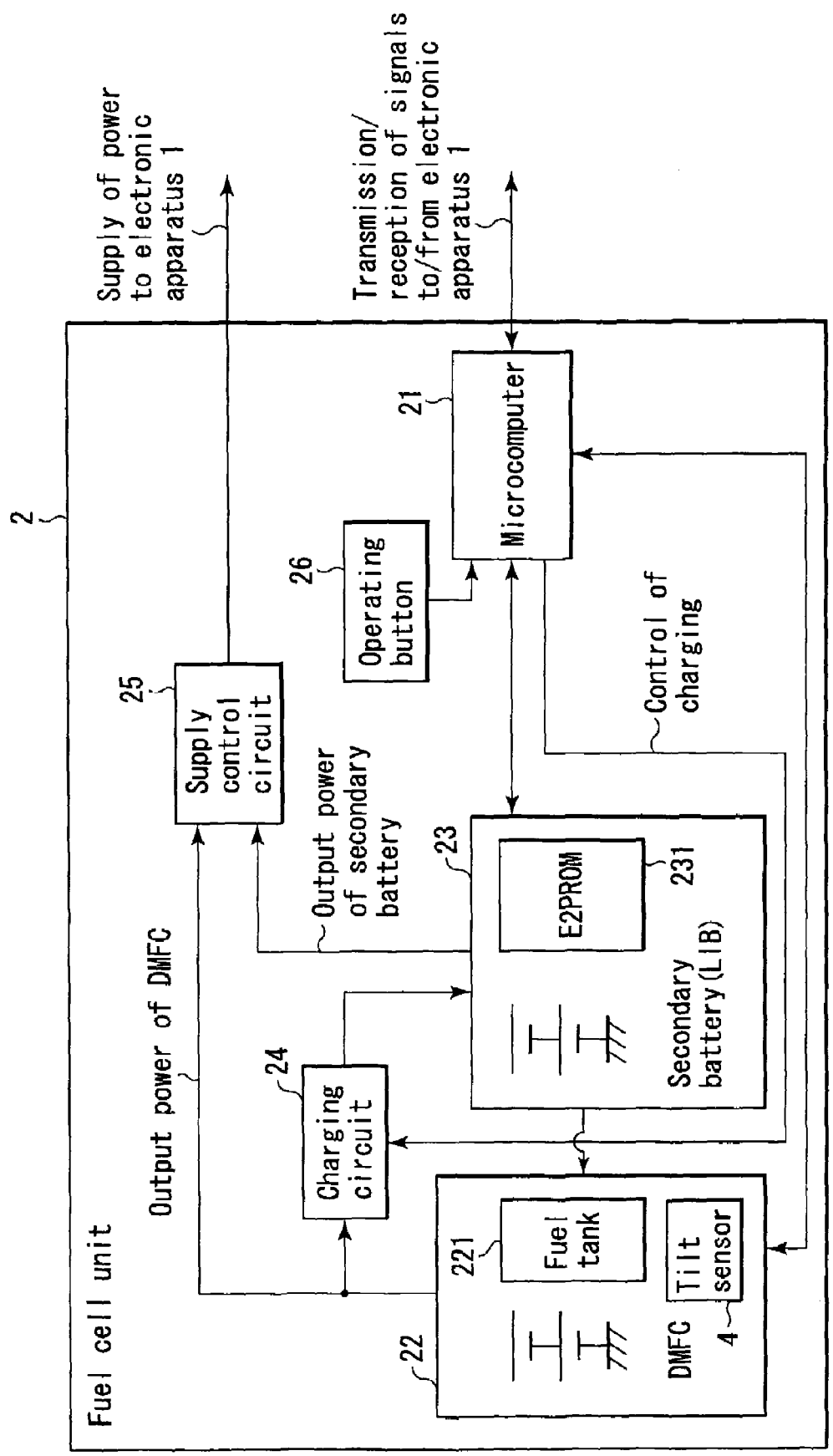
FIG. 4 is a schematic block diagram of a fuel cell unit.

FIG. 4 is a schematic block diagram of the fuel cell unit 2.

Referring to FIG. 2, the fuel cell unit 2 includes a microcomputer 21, a DMFC 22, a secondary battery 23, a charging circuit 24, a supply control circuit 25 and an operating button 26.

The microcomputer 21 controls the entire operation of the fuel cell unit 2 and has a communication function of transmitting/receiving signals to/from the electronic apparatus 1. The microcomputer 21 controls the operations of the DMFC 22 and secondary battery 23 in response to an indicating signal and performs a process corresponding to the depression of the operating button 26. In particular, the microcomputer 21 notifies the main body of the electronic apparatus 1 of information indicating a tilt angle and a tilt direction of the fuel cell and displays the information on the liquid crystal panel 1b of the electronic apparatus 1.

The DMFC 22 includes a detachable cartridge fuel tank 221 and outputs power that is generated by chemical reaction between air (oxygen) and methanol stored in the fuel tank 221. The chemical reaction occurs in a reaction section referred to as a cell stack or the like. In order to send the methanol and air into the cell stack with efficiency, the DMFC 22 has an auxiliary mechanism such as a pump. The DMFC also has a mechanism to notify the microcomputer 21 of whether the fuel tank 221 is attached or detached, the amount of methanol remaining in the fuel tank 221, the operating status of the auxiliary mechanism, and the current amount of output power.

The tilt sensor 4 is attached to the DMFC 22. The tilt sensor 4 can be provided except where the DMFC 22 is located within the fuel cell unit 2.

The secondary battery 23 stores power output from the DMFC 22 through the charging circuit 24 and outputs the power in response to the indication from the microcomputer 21. The secondary battery 23 has an EEPROM 231 that holds basic information indicative of discharge characteristics and the like. The EEPROM 231 can be accessed from the microcomputer 21. The secondary battery 23 has a mechanism to notify the microcomputer 21 of both the current output voltage and current output current. The microcomputer 21 computes the amount of power remaining in the secondary battery 23 based on both the basic information read out of the EEPROM 231 and the output voltage and current indicated by the secondary battery 23. Assume here that the secondary battery 23 is a lithium battery (LIB).

The charging circuit 24 charges the secondary battery 23 with power output from the DMFC 22. The microcomputer 21 controls whether the secondary battery 23 is charged or not.

The supply control circuit 25 outputs the power of the DMFC 22 and secondary battery 23 to the outside according to the circumstances.

The operating button 26 is a button to start/stop and control the tilt sensor 4.

Figure 5:
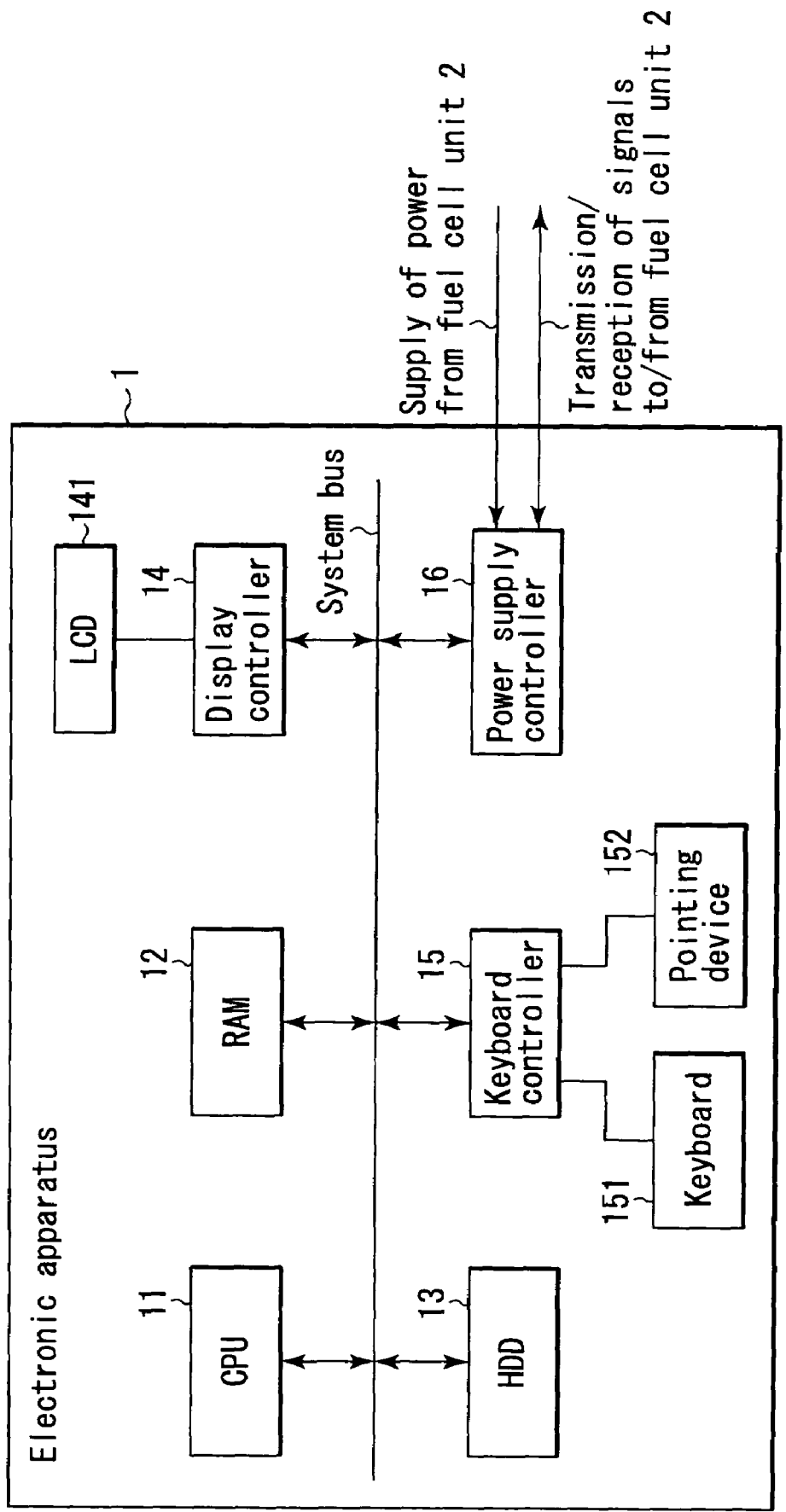
FIG. 5 is a schematic block diagram of the electronic apparatus.

FIG. 5 is a schematic block diagram of the electronic apparatus 1.

Referring to FIG. 5, the electronic apparatus 1 includes a CPU 11, a RAM (main memory) 12, an HDD 13, a display controller 14, a keyboard controller 15 and a power supply controller 16. These are connected to a system bus.

The CPU 11 controls the entire operation of the electronic apparatus 1 and executes various programs stored in the RAM 12. The RAM 12 is a memory device serving as a main memory of the electronic apparatus 1 to store various programs to be executed by the CPU 11 and various types of data to be used for the programs. The HDD 13 is a memory device serving as an external memory of the electronic apparatus 1 to store various programs and a large amount of data as an auxiliary device of the RAM 12.

The display controller 14 controls the output side of a user interface in the electronic apparatus 1 and displays image data created by the CPU 11 on an LCD 141. The keyboard controller 15 controls the input side of the user interface in the electronic apparatus 1. The controller 15 converts the operations of a keyboard 151 and a pointing device 152 into numbers and supplies them to the CPU 11 via a register included therein.

The power supply controller 16 controls the supply of power to the respective components of the electronic apparatus 1. The controller 16 has a power-receiving function of receiving power from the fuel cell unit 2 and a communication function of transmitting/receiving signals to/from the fuel cell unit 2. It is the microcomputer 21 in the fuel cell unit 2 shown in FIG. 4 that transmits/receives signals to/from the power supply controller 16.

By communication between the microcomputer 21 in the fuel cell unit 2 and the power supply controller 16 in the electronic apparatus 1, the electronic apparatus 1 is notified of the information indicating a tilt angle and a tilt direction of the DMFC 22 (or fuel cell unit 2) included in the fuel cell unit 2. Thus, the electronic apparatus 1 controls an operation based on the information.

In the present embodiment, the CPU 11 is able to acquire information indicating the tilt angle and tilt direction of the DMFC 22 (or the fuel cell unit 2) from the fuel cell unit 2 and display the information on the screen of the LCD 141. The CPU 11 also executes control programs to issue and stop a given warning, stop and restart the operation of the DMFC 22, and stop the operation of the electronic apparatus 1 in accordance with variations in the tilt angle acquired from the fuel cell unit 2.

FIG. 6 is a chart showing various conditions selected in accordance with sensed tilt angles.

As shown in FIG. 6, one of "danger area X," "warning area Y" and "safety area Z" is selected according to the tilt angle sensed by the tilt sensor 4.

The "danger area X" indicates that the tilt angle is so wide that the electronic apparatus is in a dangerous condition. When the tilt angle corresponds to the "danger area X," the electronic apparatus 1 stores necessary data and shuts down the OS. The DMFC 22 thus stops operating at once.

The "warning area Y" is located between the "danger area X" and "safety area Z" and indicates that the electronic apparatus 1 is not a safe condition. When the tilt angle corresponds to the "warning area Y," a user is warned that the fuel cell unit 2 should be reset to a horizontal condition.

The "safety area Z" indicates that the electronic apparatus 1 is in a safe condition since no tilt angle is formed or the tilt angle is smaller. When the tilt angle corresponds to the "safety area Z," the electronic apparatus 1 is continuously used in a normal condition as it is.

FIGS. 7A and 7B are charts each showing an example of display of information of tilt angle and tilt direction displayed on the screen of the LCD 141 of the electronic apparatus 1.

FIGS. 7A and 7B show tilt conditions in X- and Y-axis directions (see FIG. 2A). These tilt conditions are displayed at once on the screen of the LCD 141. The tilt conditions in both the X- and Y-axis directions are graphically displayed as shown in FIG. 6. The actual tilts of the DMFC 22 are displayed on the graphically displayed tilt conditions. In the example of FIG. 7A, the tilt in the X-axis direction corresponds to the "safety area Z." In the example of FIG. 7B, the tilt in the Y-axis direction corresponds to the "warning area Y." Since the current tilts and directions are graphically displayed, a user can easily understand what condition the DMFC 22 lies in.

Figure 8:
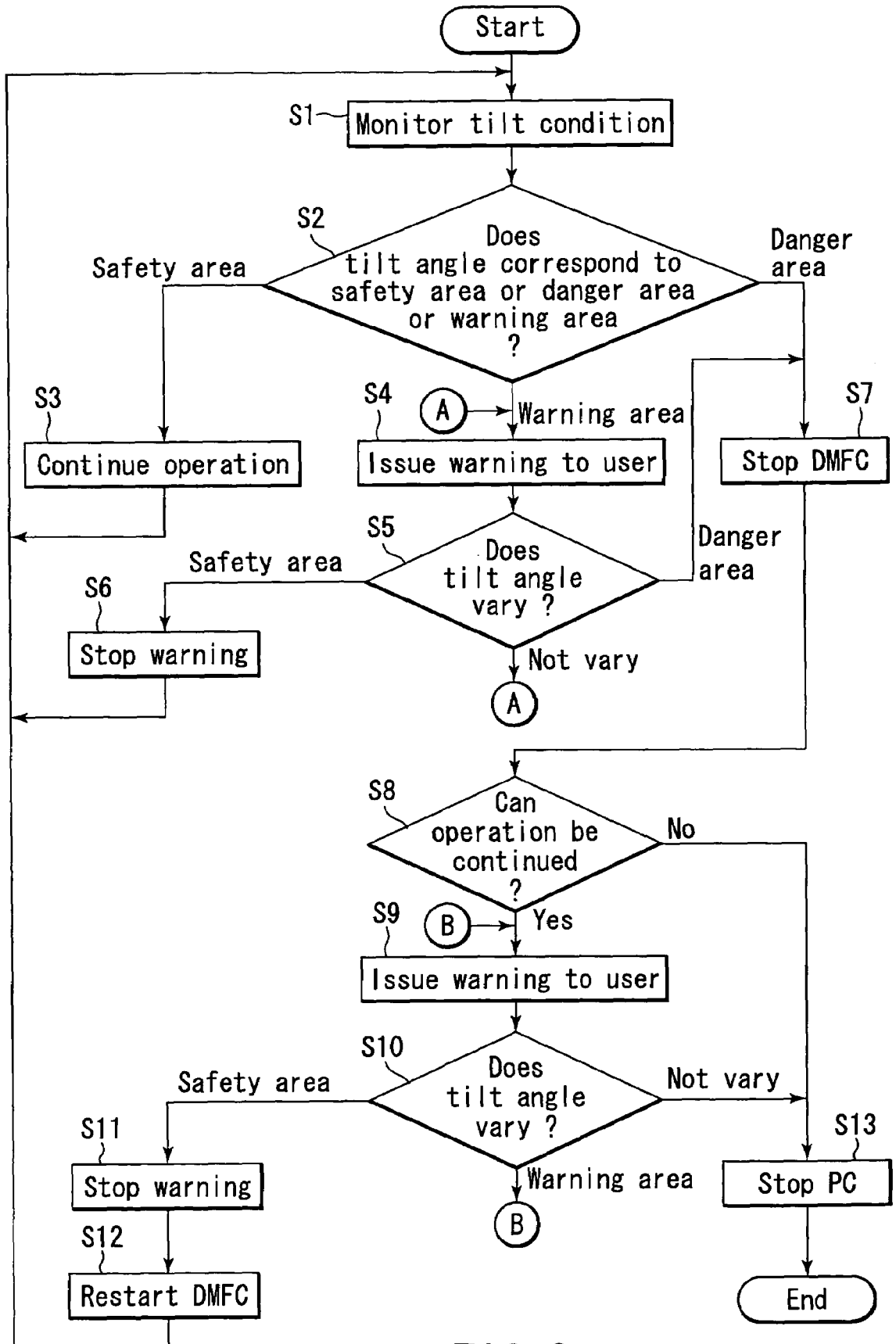
FIG. 8 is a flowchart showing a procedure for controlling an operation of the electronic apparatus system.

The procedure for controlling an operation of the electronic apparatus system according to the present embodiment will now be described with reference to the flowchart shown in FIG. 8.

The RAM 12 holds in advance a first threshold value indicating a tilt angle of the border between the "safety area Z" and "warning area Y" and a second threshold value indicating a tilt angle of the border between the "warning area Y" and "danger area X" as threshold information used for controlling the operation. The CPU 11 compares the threshold information with information of the actual tilt angle obtained from the fuel cell unit 2 to recognize which of the areas corresponds to each of the tilt angles in the X- and Y-axis directions.

The CPU 11 monitors the tilt of the DMFC 22 (or fuel cell unit 2) (step S1) and determines which of the "danger area X," "warning area Y" and "safety area Z" corresponds to the angle of the tilt (step S2).

When the tilt angle corresponds to the "safety area Z," the operation is continued as it is (step S3) and the process is repeated from step S1.

When the tilt angle corresponds to the "warning area Y," a message "Put fuel cell unit back to horizontal position" is displayed on the screen of the LCD 141 to give a warning to the user (step S4). The warning can be accompanied with a beep.

When the tilt angle corresponds to the "danger area X," necessary data is stored and the OS is shut down to stop the operation of the DMFC 22 immediately (step S7).

After the warning is issued in step S4, the CPU 11 determines whether the tilt angle varies (step S5). When the tilt angle corresponds to the "safety area Z," the warning is stopped (step S6) and the process is repeated from step S1. On the other hand, when the tilt angle remains correspondent to the "warning area Y," the process is repeated from step S4. When the tilt angle corresponds to "danger area X" after the warning, necessary data is stored and the OS is shut down to stop the operation of the DMFC 22 immediately (step S7).

After the DMFC 22 stops operation in step S7, the CPU 11 determines whether the operation can be continued by the power of the secondary battery (step S8).

If the operation cannot be continued, the electronic apparatus 1 also stops operation (step S13).

On the other hand, if the operation can be continued, the warning is given again to the user (step S9) and the CPU 11 determines whether the tilt angle varies (step S10). When the tilt angle corresponds to "safety area Z," the warning is stopped (step S11) and the DMFC 22 is started up again (step S12). The process is repeated from step S1. When the tilt angle corresponds to "warning area Y" after the warning, the process is repeated from step S9. If the tilt angle remains correspondent to the "danger area X" after the warning, the electronic apparatus 1 stops operation (step S13).

According to the above control, a process of giving a warning to the user by display and sound, a process of stopping the operation of the DMFC 22, a process of stopping the operation of the electronic apparatus 1, etc. are safely performed according to which of "danger area X," "warning area Y" and "safety area Z" corresponds to the tilt angle sensed by the tilt sensor 4. Therefore, the user can safely use the electronic apparatus system mounted with the DMFC.

There now follows an explanation as to measures taken when abnormality occurs in the function of the tilt sensor 4.

1. When the electronic apparatus 1 is driven by the DMFC 22:

If abnormality occurs in the function of the tilt sensor 4, the microcomputer 21 senses it. When the microcomputer 21 sends the electronic apparatus 1 with a signal indicating the abnormality, the CPU 11 stores necessary data and shuts down the OS to stop the operation of the DMFC 22 and that of the electronic apparatus 1.

2. When the electronic apparatus 1 is driven by an AC adapter and a secondary battery:

If abnormality occurs in the function of the tilt sensor 4, the microcomputer 21 senses it. When the microcomputer 21 sends the electronic apparatus 1 with a signal indicating the abnormality, the CPU 11 gives a warning to a user displaying, e.g., a message "Fuel cell unit cannot be used due to abnormality in tilt sensor. Receive support." on the screen of the LCD 141.

Figure 9:
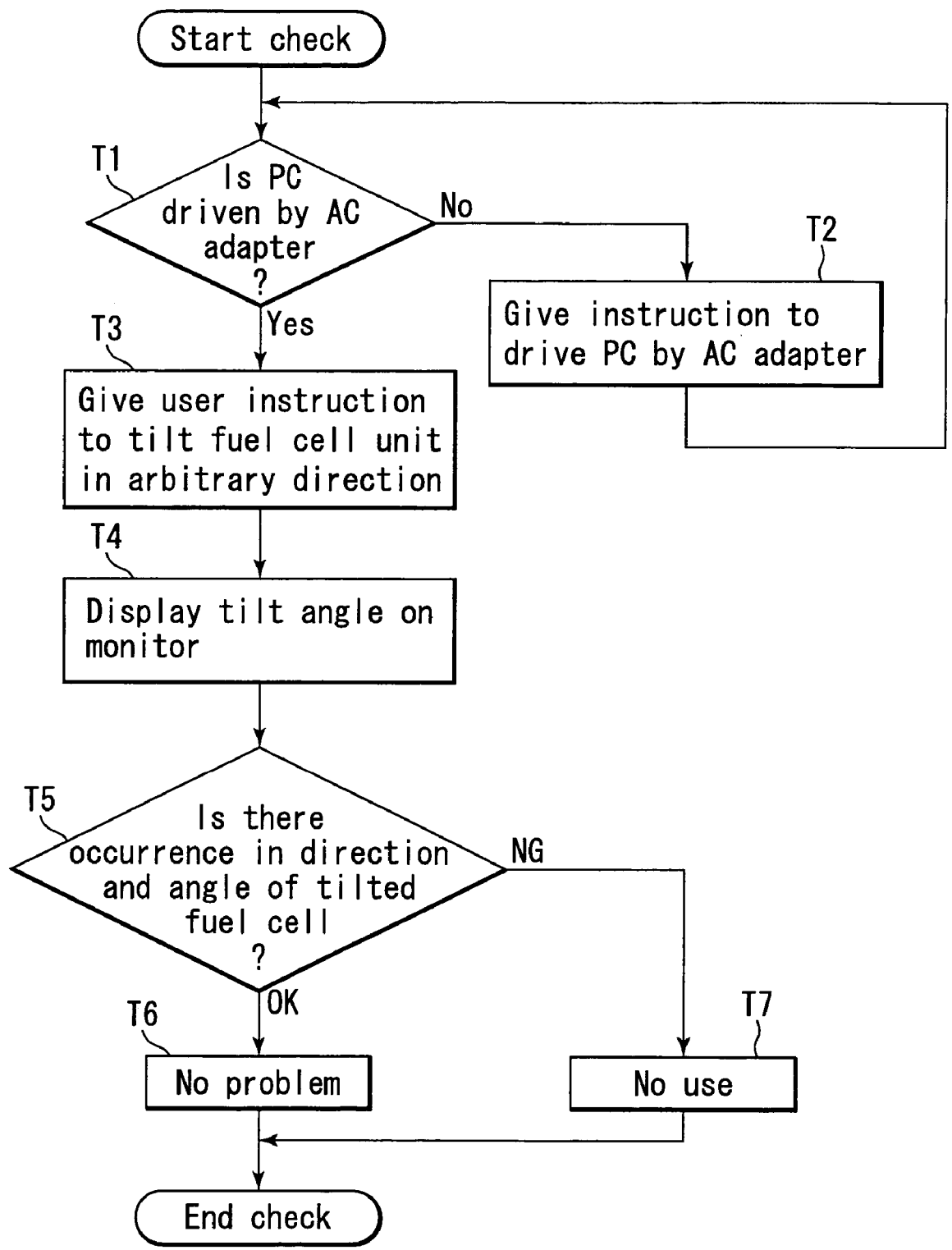
FIG. 9 is a flowchart showing a method of checking an operation of a tilt sensor of the electronic apparatus system.

A method of checking an operation of the tilt sensor 4 in the electronic apparatus 1 will now be described with reference to the flowchart shown in FIG. 9.

First, the CPU 11 determines whether or not the electronic apparatus 1 is driven by an AC adapter (step T1). If it is not driven by the AC adapter (if it is driven by the DMFC 22), the CPU 11 gives an instruction to drive the electronic apparatus 1 by the AC adapter to a user through the screen of the LCD 141 (step T2).

After the CPU 11 confirms that the electronic apparatus 1 is driven by the AC adapter, it gives the user an instruction to tilt the fuel cell unit 2 in an arbitrary direction through the screen of the LCD 141 (step T3). The screen of the LCD 141 displays the current tilt angle (step T4).

The user checks whether the tilt sensor 4 operates normally on the screen of the LCD 141. In other words, the user confirms whether the direction and tilt angle at which the fuel cell unit 2 is tilted coincide with the direction and tilt angle displayed on the screen (step T5). It is desirable to display, e.g., a message "Receive support if no coincidence occurs in direction and tilt angle." on the screen of the LCD 141.

If a coincidence occurs in direction and tilt angle, the CPU 11 determines that the electronic apparatus 1 has no problem (step T6) and ends the process. If no coincidence occurs, the electronic apparatus 1 has a problem and thus the CPU 11 decides to prevent it from being used (step T7) and ends the process.

The correction function of the tilt sensor 4 will now be described.

When the electronic apparatus system is used in, e.g., a moving automobile, the fuel cell unit 2 is often tilted. The accuracy of the tilt sensor 4 is therefore important. The accuracy of the tilt sensor 4 is confirmed in the manufacturing process such as a manufacturing line and, if necessary, the tilt sensor 4 is provided with a correction function. However, it is not desirable to open the correction function to a user in terms of the need to sense abnormality. When the tilt sensor 4 is repaired, the correction function can easily be checked by monitoring the operation of the tilt sensor 4 from the electronic apparatus 1.

The following is an example of procedure for performing the correction function.

1. The electronic apparatus 1 mounted with the fuel cell unit 2 is placed on a horizontal table.

2. A tilt angle of the fuel cell unit 2 is designated on the screen of the electronic apparatus 1.

3. An operator sets the fuel cell unit 2 at the designated tilt angle (keeps the designated tilt angle using a pedestal).

4. The electronic apparatus 1 notifies the fuel cell unit 2 that the designated tilt angle can be held.

5. The fuel cell unit 2 compares the tilt angle sensed by the tilt sensor 4 with the actual tilt angle and corrects an error in the sensed value, if any.

6. The above steps 2 to 5 are repeated (an error in different tilt angle is corrected).

7. If the above steps are repeated a required number of times, the error correction is completed (if, however, an error is larger than a reference value, it is reported to the operator).

According to the embodiment of the present invention described above, a process of giving a warning to a user by display and sound, a process of stopping the operation of the DMFC 22, a process of stopping the operation of the electronic apparatus 1, etc. are safely performed according to which of "danger area," "warning area" and "safety area" corresponds to the tilt angle sensed by the tilt sensor 4. Therefore, the user can safely use the electronic apparatus system mounted with the DMFC.

According to the present embodiment, even when abnormality occurs in the function of the tilt sensor, an appropriate process is performed according to the conditions of use of the electronic apparatus. The process can thus be performed safely.

According to the present embodiment, since the operation of the tilt sensor 4 can easily be checked and enhanced by the electronic apparatus 1, the electronic apparatus system in use can be increased in safety.

According to the present embodiment, since the accuracy of the tilt sensor 4 can easily be checked by the electronic apparatus 1, the electronic apparatus system in use can be more increased in safety.

In the above embodiment, the tilt sensor is included in the DMFC. However, it can be provided except where the DMFC is provided if the tilt angle of the DMFC has only to be sensed.

As has been described in detail above, the present invention can prevent a danger due to the fuel cell unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus which is configured to connect to a fuel cell unit including a fuel cell configured to generate power by chemical reaction and a sensor configured to sense a tilt of the fuel cell, and which is configured to be driven with power supplied from the fuel cell, the information processing apparatus comprising:

a controller to receive information indicative of the tilt of the fuel cell sensed by the sensor; and a processing unit to notify a user of information indicative of the tilt of the fuel cell received by the controller, wherein the processing unit displays the information indicative of the tilt of the fuel cell and the processing unit displays information indicative of a direction of the tilt of the fuel cell.

2. An information processing apparatus which is configured to connect to a fuel cell unit including a fuel cell configured to generate power by chemical reaction and a sensor configured to sense a tilt of the fuel cell, and which is configured to be driven with power supplied from the fuel cell, the information processing apparatus comprising:

a controller to receive information indicative of the tilt of the fuel cell sensed by the sensor; and a processing unit to notify a user of information indicative of the tilt of the fuel cell received by the controller, wherein the processing unit gives a warning to a user when a value of the tilt is larger than a first threshold value and the processing unit stops an operation of the cell unit, when a value of the tilt is larger than a second threshold value different from the first threshold value, or when a value of the tilt is not smaller than the first threshold value after the warning is given.

3. A method of controlling an operation of an information processing apparatus which is structured to be connected to a fuel cell unit including a fuel cell configured to generate power by chemical reaction and a sensor configured to sense a tilt of the fuel cell, and which is configured to be driven with power supplied from the fuel cell, the method comprising:

receiving, by the information processing apparatus, information indicative of the tilt of the fuel cell sensed by the sensor;

notifying a user of the information indicative of the tilt of the fuel cell received by the information processing apparatus;

displaying the information indicative of the tilt of the fuel cell on a screen of the information processing apparatus; and displaying information indicative of a direction of the tilt of the fuel cell on the screen of the information processing apparatus.

4. A method of controlling an operation of an information processing apparatus which is structured to be connected to a fuel cell unit including a fuel cell configured to generate power by chemical reaction and a sensor configured to sense a tilt of the fuel cell, and which is configured to be driven with power supplied from the fuel cell, the method comprising:

receiving, by the information processing apparatus, information indicative of the tilt of the fuel cell sensed by the sensor;

notifying a user of the information indicative of the tilt of the fuel cell received by the information processing apparatus, wherein the notifying includes giving a warning to a user when a value of the tilt is larger than a first threshold value; and stopping an operation of the fuel cell, when a value of the tilt is larger than a second threshold value, or when a value of the tilt is not smaller than the first threshold value after the warning is given.

5. The method according to claim 4, wherein the notifying includes giving the warning to a user by driving a secondary battery after the fuel cell stops operating.

* * * * *